US012617926B2

(12) United States Patent
Piluso et al.

(10) Patent No.: US 12,617,926 B2
(45) Date of Patent: May 5, 2026

(54) RECYCLING OF PRE-IMPREGNATED FIBER MATERIALS

(71) Applicant: COMMISSARIAT A L'ENERGIE ATOMIQUE ET AUX ENERGIES ALTERNATIVES, Paris (FR)

(72) Inventors: Pierre Piluso, Grenoble (FR); Pascal Tiquet, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 117 days.

(21) Appl. No.: 18/606,385

(22) Filed: Mar. 15, 2024

(65) Prior Publication Data

US 2024/0309171 A1    Sep. 19, 2024

(30) Foreign Application Priority Data

Mar. 15, 2023    (FR) ..................................... 23/02377

(51) Int. Cl.
| | |
|---|---|
| *C08J 11/26* | (2006.01) |
| *B29B 17/00* | (2006.01) |
| *B29C 43/00* | (2006.01) |
| *B29C 43/14* | (2006.01) |
| *B29C 43/52* | (2006.01) |
| *B29K 63/00* | (2006.01) |
| *B29K 105/08* | (2006.01) |
| *B29K 307/04* | (2006.01) |
| *C08J 5/24* | (2006.01) |
| *C08J 11/22* | (2006.01) |

(52) U.S. Cl.
CPC .............. *C08J 11/26* (2013.01); *B29B 17/00* (2013.01); *B29B 17/0005* (2013.01); *B29B 17/0042* (2013.01); *B29C 43/003* (2013.01); *B29C 43/14* (2013.01); *B29C 43/52* (2013.01); *C08J 5/243* (2021.05); *C08J 11/22* (2013.01); *B29C 2043/144* (2013.01); *B29K 2063/00* (2013.01); *B29K 2105/0845* (2013.01); *B29K 2307/04* (2013.01); *C08J 2300/24* (2013.01); *C08J 2300/30* (2013.01); *C08J 2363/00* (2013.01); *Y02W 30/62* (2015.05)

(58) Field of Classification Search
CPC ... C08J 11/26; C08J 5/243; C08J 11/22; C08J 2300/24; C08J 2300/30; C08J 2363/00; C08J 11/04; C08J 11/10; C08J 11/105; C08J 11/16; C08J 11/18; C08J 11/20; C08J 11/24; C08J 11/28; B29B 17/00;

B29B 17/0005; B29B 17/0042; B29B 11/12; B29B 11/14; B29B 15/00–14; B29C 43/003; B29C 43/14; B29C 43/52; B29C 2043/144; B29K 2063/00; B29K 2105/0845; B29K 2307/04; Y02W 30/62
See application file for complete search history.

(56) References Cited

U.S. PATENT DOCUMENTS

| | | | | |
|---|---|---|---|---|
| 10,822,467 | B2 * | 11/2020 | Yue ........................... | C08J 3/203 |
| 11,713,370 | B1 * | 8/2023 | Dustin ................... | C08G 18/12 |
| | | | | 528/60 |
| 11,746,208 | B2 * | 9/2023 | Yue ........................... | C08J 11/16 |
| | | | | 521/49 |
| 2011/0319524 | A1 * | 12/2011 | Leibler ................... | C08L 63/00 |
| | | | | 523/400 |
| 2017/0044361 | A1 * | 2/2017 | Duquenne ............... | C08L 63/00 |
| 2017/0218149 | A1 * | 8/2017 | Schmidt ................... | C08J 5/244 |
| 2018/0312657 | A1 * | 11/2018 | Yue ........................... | C08J 3/203 |
| 2019/0322835 | A1 * | 10/2019 | Qi ............................ | C08J 5/121 |
| 2021/0032432 | A1 | 2/2021 | Manas-Zloczower et al. | |
| 2021/0054160 | A1 * | 2/2021 | Yue ........................... | C08J 11/04 |
| 2022/0267562 | A1 | 8/2022 | Fortman et al. | |
| 2022/0282056 | A1 | 9/2022 | Manas-Zloczower et al. | |
| 2023/0067778 | A1 * | 3/2023 | Spiesschaert ............ | C08K 3/04 |
| 2024/0026102 | A1 * | 1/2024 | Gupta ...................... | C08J 5/244 |

FOREIGN PATENT DOCUMENTS

WO     2010/010584 A1    1/2010

OTHER PUBLICATIONS

Yue et al.; "Vitrimerization: A Novel Concept to Reprocess and Recycle Thermoset Waste via Dynamic Chemistry;" Global Challenges; 2019; pp. 1-6; vol. 3, No. 1800076.

(Continued)

*Primary Examiner* — Jeffrey M Wollschlager
(74) *Attorney, Agent, or Firm* — Oliff PLC

(57) ABSTRACT

A method for recycling prepreg materials including the steps of: a) providing at least one prepreg material including a first thermosetting polymer resin, partially crosslinked, and a weave including fibers, b) applying a vitrimerization reaction mixture to the at least one prepreg material, c) placing the at least one prepreg material coated with the vitrimerization reaction mixture on a mold of a predefined shape, d) applying a thermocompression to the at least one prepreg material at a temperature (T1) greater than or equal to the glass transition temperature (Tg) of the first resin, so as to activate the reaction between the vitrimerization reaction mixture and the thermosetting polymer leading to the formation of a vitrimer polymer and the transformation of the at least one prepreg material into a vitrimer composite material of the predefined shape.

9 Claims, 3 Drawing Sheets

(56) References Cited

OTHER PUBLICATIONS

Hao et al.; "Recovery of Carbon Fibre from Waste Prepreg via Microwave Pyrolysis;" Polymers; 2021; pp. 1-15; vol. 13, No. 1231.
Nilakantan et al.; "Reuse and Upcycling of Thermoset Prepreg Scrap: Case Study with out-of-Autoclave Carbon Fiber/Epoxy Prepreg.;" Journal of Composite Materials; 2018; pp. 341-360; vol. 52, No. 3.
Nilakantan; "Reuse and Upcycling of Aerospace Prepreg Scrap and Waste;" Reinforced Plastics; 2015; pp. 44-51; vol. 59, No. 1.

* cited by examiner

I $$\left[ H_3C - \overset{\displaystyle O}{\overset{\|}{C}} - O^- \right]_2 Zn^{2+} \cdot 2H_2O$$    III

RECYCLING OF PRE-IMPREGNATED FIBER MATERIALS

The present invention relates to the field of prepreg composite materials intended to form fiber-reinforced composite materials with reinforcement. In particular, the invention concerns a method for recycling prepreg composite materials out of use so as to allow them to be reshaped and/or repaired. According to a second aspect, the invention concerns an intermediate material comprising a prepreg composite material coated with a vitrimerization reaction mixture, in particular obtained at the end of an intermediate step of the recycling method.

The composite materials reinforced with fibers are mainly used to replace metals to lighten structures, in a wide range of application: sport (cycles, board sports), transport (structure of cars, trains), aerospace (structure of planes, space shuttles).

These systems consist of a thermosetting polymer resin, crosslinked during the shaping of the material, and of a reinforcement, in particular a fiber weave, which can be of variable nature (mainly carbon fibers, glass fibers, fibers of polymers . . . ) and organization (woven according to different models, non-woven).

One of the ways of shaping these composites is to carry out a prepreg of the fiber weave with the non-crosslinked resin, so as to obtain a prepreg composite material. This prepreg composite is then covered with a protective film known under the name "backing", allowing the prepreg to be rolled and transported in a reel to the place of use. Indeed, the resin not being crosslinked at this stage, it has a sticky nature which prevents the prepregs from being stacked and stored thus before use. At the time of use, the rolls of prepregs are cut with their backing to the right size from the reels, then the prepreg sheets without their backing are stacked so as to obtain the desired composite thickness and are hot pressed to the desired shape. During heating, the resin crosslinks irreversibly, and the composite thus formed is then demolded.

If the use of prepreg composites allows for great simplicity of implementation such as the absence of resin handling by the user and the possible custom cutting, it nevertheless includes defects. First, the crosslinking reaction of resins of the prepreg composites occurs at any temperature, although the lower the temperature, the slower the reaction progresses. This involves either storing rolls of prepreg materials under specific conditions, typically via refrigeration, or using them quickly once received. Thus, in practice, significant lengths and masses of prepreg materials may be lost because having exceeded their lifetime recommended by the supplier at a given storage temperature, the crosslinking reaction has progressed too far to allow their shaping. The result is that a large quantity of these prepregs becomes waste, causing a significant environmental issue. In addition, the method for cutting prepreg materials involves the existence of cutting scraps. These scraps currently find it difficult to find applications, even if some are starting to emerge at industrial levels, but which systematically lead to a strong devaluation of the material and are typically used for consumer goods.

One of the objects of the present invention aims to overcome at least one of the aforementioned drawbacks. To this end, the present invention proposes a method for recycling prepreg materials comprising the steps of:

a) providing at least one prepreg material comprising a first thermosetting polymer resin, partially crosslinked, and a weave comprising fibers, b) applying a vitrimerization reaction mixture to the at least one prepreg material, c) placing the at least one prepreg material coated with the vitrimerization reaction mixture on a mold of a predefined shape, d) applying a thermocompression to the at least one prepreg material at a temperature $T1$ greater than or equal to the glass transition temperature $Tg$ of the first resin, so as to activate the reaction between the vitrimerization reaction mixture and the thermosetting polymer leading to the formation of a vitrimer polymer and the transformation of the at least one prepreg material into a vitrimer composite material of the predefined shape.

Thanks to the method of the invention, it is possible to recycle prepreg materials, the first resin of which is partly crosslinked and which is out of use for reasons of aging (storage conditions under conditions not making it possible to avoid partial crosslinking of the first resin and/or the storage period given by the supplier has been exceeded) or which comes from scraps from the cuts of a prepreg. It is in fact possible to carry out hot reshaping or to locally repair the first resin using a vitrimerization reaction mixture which uses a dynamic covalent chemistry leading to vitrimers whose viscoelastic properties are similar to those of glass.

Thus, the application of a mechanical force at a temperature $T1$ above or equal to the glass transition temperature $Tg$ of the vitrimer polymer makes it possible to soften the prepregs in order to reshape or repair them.

According to one arrangement, the temperature $T1$ is comprised between 180 and 280° C.

By the terms 'recycling' or 'recycle' we mean the reshaping and/or repair of crack(s) that appeared in the first resin of the prepreg for a new use and the obtention of a vitrimer composite material which can be remodeled or reshaped in turn by the presence of the vitrimer resin.

The terminology relating to a first thermosetting polymer resin, 'partially crosslinked' is well known to those skilled in the art of polymer and prepreg materials as a resin which retains functions accessible for a crosslinking or for a side reaction, here an exchange reaction for a vitrimerization.

In particular, in the partially crosslinked epoxy-amine resins, amine functions remain available. It is the latter which allow exchange reactions. There are also still epoxide functions available, but these may directly react with the added anhydrides. In addition, these partially crosslinked resins are still soluble in certain solvents, for example the DMF, which is not the case when the crosslinking is complete. It is in particular possible to dissolve between approximately 30% and 50% by mass in the DMF in 24 hours at ambient temperature of the first resin of the prepreg of step a) of the method. This first partially crosslinked resin may effectively lead to the vitrimerization.

The placement of the prepreg material in the mold of a predefined shape, which can be a press plate, includes the positioning of one or more prepreg materials on the mold so as to orient the fibers in the desired manner and to superimpose several prepreg materials until the desired thickness of composite material is reached.

According to one possibility, the recycling method comprises the steps of:

e) arranging the vitrimer composite material shaped according to step d) on a second mold of a determined conformation, and f) applying a thermocompression to the vitrimer composite material at said temperature $T1$ so as to reshape the vitrimer composite material.

It is thus possible to give a second life to the vitrimer composite material without devaluation or reduction in the mechanical properties of the initial material. By the expressions 'reshape' or 'reshaping' it is understood a remodeling, a re-shaping into another conformation or repairing defects, such as cracks appearing in the vitrimer resin. This is achieved by softening the vitrimer resin and applying a pressure to the composite.

According to one arrangement, the vitrimerization reaction mixture comprises precursor compounds of a second resin, such as an epoxy-amine, epoxy-anhydride, epoxy-phenol system or an epoxy-disulfide system, and a catalyst for transformation into vitrimer resin, chosen from an organometallic or organic compound, for example zinc acetate or a ternary amine respectively.

This composition allows the thermoactivated exchange of functions in the first initial resin which leads to the transformation into vitrimer whose internal structure is a particular form of crosslinking, called "dynamic" or "reversible", where the covalent bonds between macromolecules may be undone and redone, with the possibility of interchanging certain molecules; their internal chemical network is permanent but its topology may be reorganized through exchange reactions which keeps the number of bonds constant.

Concretely, the vitrimerization reaction mixture has a maximum viscosity of 2 Pa·s (2000 cP) so as to be able to coat the prepreg material uniformly.

According to one possibility, the second resin comprises accessible hydroxyl groups, so as to allow function exchange reactions with the first thermosetting resin.

Concretely, the molar ratio of the epoxide functions to the anhydride functions is at least 1. Thus, the stoichiometry of the precursor compounds of the second resin is such that all of the epoxide groups may react, so that it remains on the network of the accessible hydroxyl groups.

According to one characteristic, the proportion of transformation catalyst is comprised between 2 to 15% by weight of the reaction mixture.

The catalyst for transformation into vitrimer resin may also act as a crosslinking accelerator for the thermo-curable polymer of the prepreg. This results in an acceleration of the vitrimerization.

Concretely, the application of the thermal treatment of step d) is for example carried out in a temperature range T1 ranging from 160° C. to 280° C. This temperature range varies according to the glass transition temperature Tg which is linked to the nature of the thermosetting polymer but also to the fibers used and to the nature of the catalyst for transformation into vitrimer resin. The maximum temperature of the temperature range T1 is determined by the degradation temperature of the compounds (typically observed in TGA analysis). The volatility 10 and stability of the components of the vitrimerization formulation may also limit this maximum temperature.

According to one characteristic, the pressure used in step d) is comprised in a range from 2 to 20 MPa. The value of the optimal pressure depends on the shape, surface quality, and desired vitrimerization speed. A high pressure improves the vitrimerization (the covalent bonds are closer or "more in contact" and may exchange better).

According to one arrangement, the application of the reaction mixture is carried out by spraying onto the at least one prepreg material. For example, the reaction mixture and its spraying are carried out in a temperature range independent and comprised between ambient and 80° C. under an inert atmosphere or in air, and of course at a temperature lower than that of the crosslinking. The flow rate of manual or automatic spraying may be comprised between 0.01-0.1 mL/cm²/s. According to this embodiment, the composition of the reaction mixture further comprises additives to adapt the mixture to the spray application method. The additives are in particular diluents or rheo-thickening additives. This application method advantageously makes it possible to control the quantity of mixture applied.

According to one variant, the application of the vitrimerization reaction mixture is carried out by:

i) soaking the at least one prepreg material in a bath of vitrimerization reaction mixture for coating said at least one prepreg material, ii) filtering the vitrimerization reaction mixture, and recovering said at least one coated prepreg material.

After filtration and drying, the coated prepregs can be stored without temperature conditions, used as is, or transported to their shaping location.

According to one particular embodiment, the first resin of the at least one prepreg material is made of epoxy-amine polymer, in particular DGEBA for the epoxy part and the amine is chosen from diethylenetetramine, a polyether-amine, an aromatic amine or a mixture of these compounds, and the vitrimerization reaction mixture consists of DGEBA, (acronym for Bisphenol A diglycidyl ether), phthalic anhydride, zinc acetate, and an acetone solvent. These reactive compounds of the reaction mixture are available from the supplier Sigma-Aldrich.

According to another example, the first resin of the at least one prepreg material is made of phenolic resin, in particular a mixture of cardanol for phenol, citric acid, and formaldehyde, and the vitrimerization reaction mixture consists of DGEBA, (acronym for Bisphenol A diglycidyl ether), phthalic anhydride, zinc acetate, and an acetone solvent.

The method is also applicable to other resins, such as for example:

polyester resins (epoxy-anhydride),

BMI (bismaleimide) resins, and cyanate ester resins.

According to one arrangement, the method further comprises the total recycling steps of:

g) arranging the vitrimer composite material in a composition comprising at least one monofunctional alcohol, h) applying a thermal treatment at a temperature T2 greater than or equal to Tg so as to allow the dissolution of the vitrimer resin and the recovery of the fibers of the weave so as to recycle the compounds of the vitrimer composite material.

Thus treated, the vitrimer composite material is recycled and its recovered fibers may be reused. Preferably, the vitrimer composite material is completely recycled.

According to a second aspect, the invention further proposes an intermediate material, which can in particular be obtained at the end of step b), or ii) of the recycling method, the intermediate material comprising a coated prepreg material including a first partially crosslinked thermosetting polymer resin, a weave comprising fibers, the first resin being coated with a vitrimerization reaction mixture suitable for the vitrimerization of the thermosetting polymer during the application of a thermal treatment at a temperature T1 greater than or equal to the glass transition temperature Tg of the thermosetting polymer. This intermediate material has the advantage of being able to be reused as such in a reshaping step to lead to a vitrimer composite material, to be stored or to be transported to the shaping location without conditions of storage period or temperature. The application of a temperature Tg is sufficient for the vitrimerization of the first thermosetting resin. It may be applied in conjunction with a compression allowing to obtain a very high quality, heavily loaded composite material with a significant fiber volume fraction.

According to other characteristics, the recycling method of the invention includes one or more of the following optional characteristics considered alone or in combination:

The thermocompression step d) is carried out over a period ranging from 3 to 30 minutes.

The prepreg material is a three-dimensional piece, e.g. a film, a coating.

The weave consists of carbon fibers.

The weave consists of fiberglass.

The weave consists of natural fibers, notably cellulose fibers of various origins, chitosan.

The weave consists of synthetic fibers, notably PA and PET. In this case, the thermal treatments used in the method are limited by the melting temperature of the fibers.

The mold of a predefined shape is different or identical to the second mold of a determined conformation.

The epoxy-disulfide system used in the vitrimerization reaction mixture comprises a disulfide chosen from 2-aminophenyl disulfide, and the compounds carrying silyl ether bonds such as 1,3-bis(3-aminopropyl)-1,1, 3,3-tetramethyl disiloxane.

Other characteristics and advantages will appear on reading the detailed description below, of two non-limiting examples of implementation, made with reference to the appended figures in which:

FIG. 1 represents an example of an exchange reaction of ester function by transesterification in a dynamic covalent network according to one embodiment of the invention.

FIG. 2 represents an example of an exchange reaction of disulfide functions in a dynamic covalent network according to another embodiment of the invention.

FIG. 3 represents an example of an exchange reaction of silyl ether functions in a dynamic covalent network according to yet another embodiment of the invention.

FIG. 4 represents the composition of a vitrimerization reaction mixture according to one embodiment of the invention.

FIG. 5 represents a first step of the anhydride-epoxy reaction from an alcohol.

FIG. 6 illustrates a second step of the anhydride-epoxy reaction of the vitrimerization reaction mixture.

FIG. 7 illustrates a function exchange reaction between a partially crosslinked epoxy-anhydride system and a free amine present in the vitrimerization epoxy-anhydride system according to one embodiment of the invention.

Figures 1, 2, 3:
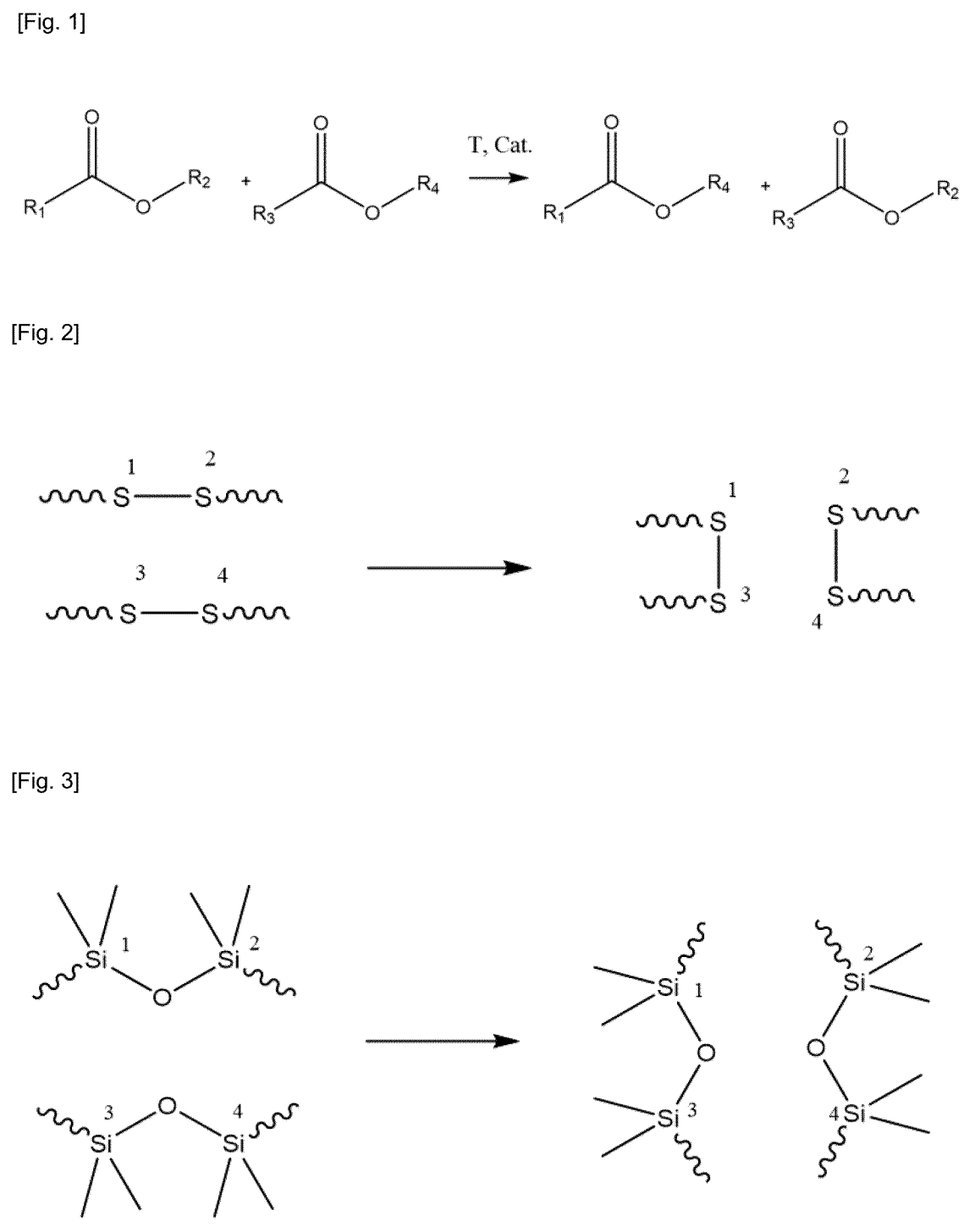

As will be seen in the detailed examples below, the invention consists in allowing the reuse of prepreg materials out of use for reasons of aging (storage outside ideal conditions, storage too long), such as only scraps of cuttings. To do this, the method consists in applying a reaction mixture of activator compounds to the prepreg material which will integrate with the first prepreg resin and allow the final composite material to have the characteristics of a dynamic covalent network, capable of exchange reactions so as to allow its reshaping when hot, despite a significant state of crosslinking, taking advantage of the use of the dynamic covalent chemistry. The dynamic covalent networks, or vitrimer networks, are crosslinked polymer networks with the particularity of having characteristics of thermosetting at low temperatures and of thermoplastics at high temperatures. These characteristics arise from the presence of dynamic covalent chemical bonds, that is, exchange reactions may occur between chains and rearrange the topologyo of the network, while maintaining a constant crosslinking rate (refer to one example of exchange reaction FIG. 1). These exchanges are controlled kinetically and may only take place once the glass transition temperature of the polymer has been exceeded (conditions the mobility necessary for the reactions) and once the minimum temperature for the reaction to take place, linked to the activation energy of the exchange reaction.

The invention therefore consists in using the residual reactivity of the first incompletely crosslinked resin to integrate chemical patterns making it possible to obtain a dynamic covalent network. The added patterns are preferably similar to those of the first resin used in the prepreg, such as epoxy-amine or epoxy-anhydride systems etc., or may be based on different exchange chemistries disulfide, silyl ethers—FIGS. 1 to 3))

Typically, the epoxy amines create amines, epoxy anhydrides create esters. In both cases, disulfide or silyl-ether bonds are integrated into the existing epoxy-amine network. This may be done in particular by adding precursors carrying groups reactive with epoxy or amines existing in the first partially crosslinked resin (e.g. alcohols or amines which can react with epoxy, anhydrides, epoxy which can react with amines)

Typically, if disulfide bonds are desired, a compound carrying a disulfide bridge and at least two amines or alcohols may be reacted so that it is integrated into the existing resin and acts as a dynamic crosslinker.

Example of embodiment 1: application of a vitrimerization reaction mixture by impregnation via a solvent bath.

Figures 4, 5:
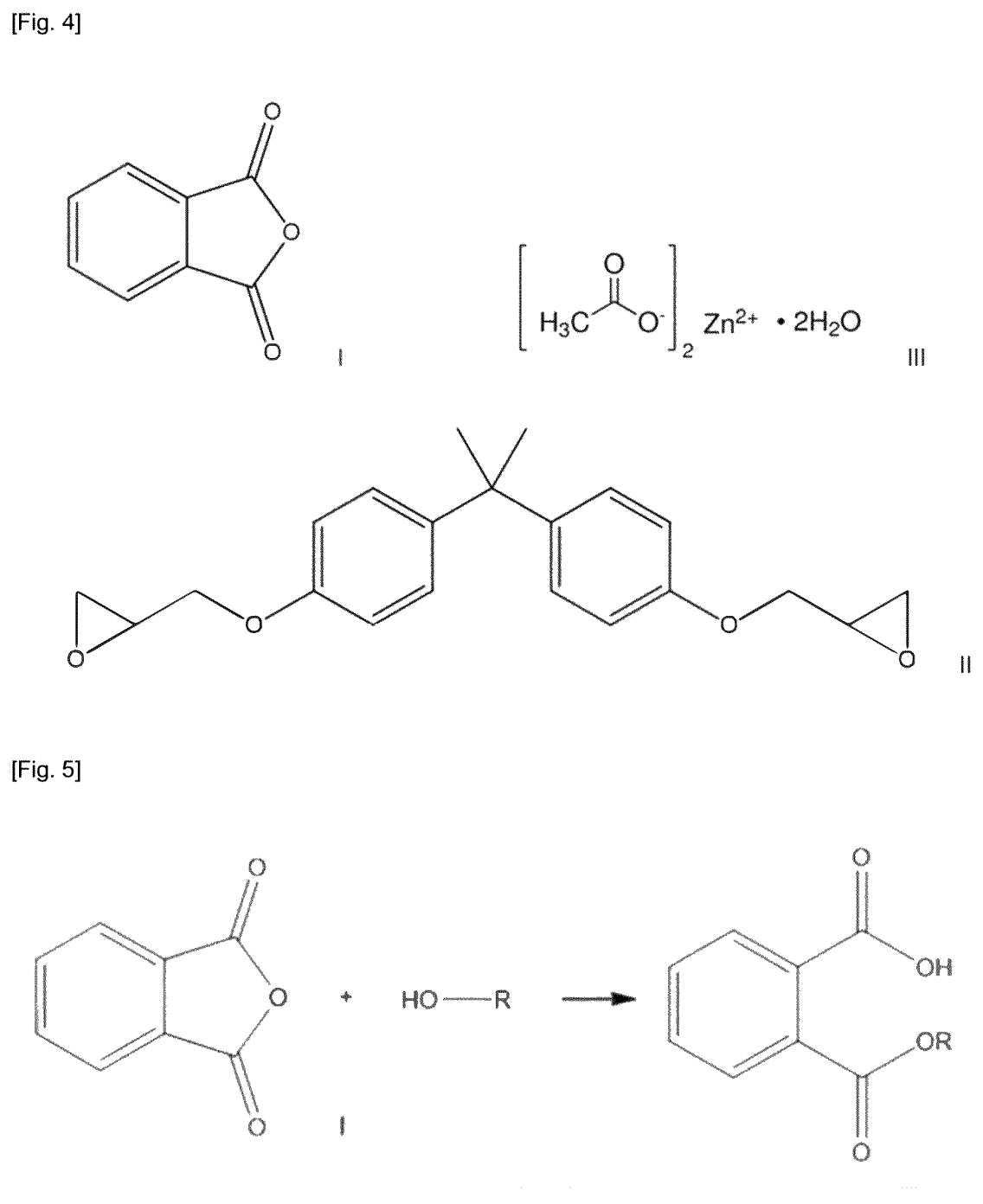
Figures 6, 7:
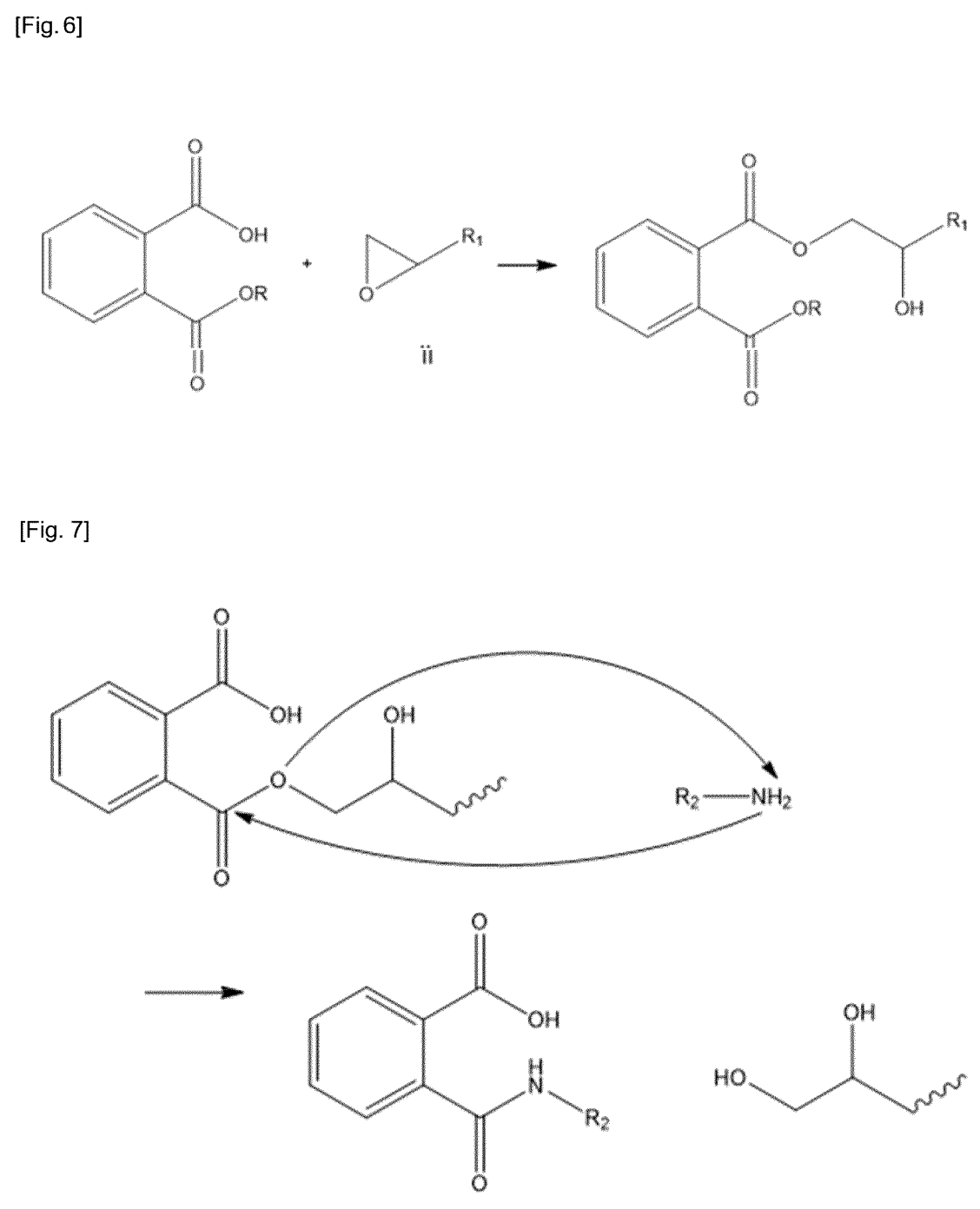

A vitrimerization reaction mixture (FIGS. 4 to 6) is formed from:

500 ml of acetone, 25 g of epoxy DGEBA II (0.073 mol), 16 g of phthalic anhydride I (0.108 mol), and 10 g of zinc acetate III (0.045 mol)

Then 50 g of prepreg materials reinforced with carbon fibers, based on a first epoxy-amine resin, stored at ambient temperature for more than 30 days, with dimensions 1 cm by 2 cm, are immersed in the bath of the reaction mixture described above at ambient pressure and temperature.

After 24 hours of immersion with light stirring at ambient temperature, the prepreg materials are filtered from the reaction mixture, then dried at ambient temperature for 4 hours.

Two prepreg materials are then placed one against the other, then between 2 steel plates covered with fiber-reinforced Teflon. Everything is placed in a hot press, heated to 240° C., under 10 MPa pressure, for a period of 5 minutes. The pressure is then removed and the two prepreg materials are recovered. We then observe an adhesion between the two prepreg materials, without apparent destruction of the fibrous structures. The first thermosetting resin having now crosslinked and being vitrimerized, a vitrimer composite material is obtained. According to another possibility, at least two pieces of prepreg materials are juxtaposed two by two in the mold so as to enlarge the surface of the final vitrimer composite material. According to yet another possibility, at least two pieces of prepreg materials are disposed on top of each other so as to give the desired shape and properties to the final vitrimer composite.

The vitrimer composite material thus formed is then reshaped under stress and temperature. The assembly of 2 prepregs is placed on a mold including an angle at 90° C., and heated to 240° C. A stress is gradually applied to the composite until reaching 10 MPa. The vitrimer composite is capable of deforming without breaking until it matches the angle of the mold. It retains this shape after cooling.

For comparison, when 2 pieces of prepreg materials not previously immersed in the vitrimerization reaction mixture are compressed under the same conditions, numerous cracks are visible on the surface due to the loosening of the crosslinked resin from the fibers.

Example of embodiment 2: application of the vitrimerization reaction mixture by spraying A vitrimerization reaction mixture (FIGS. 4 to 6) is formed from:

50 ml of acetone, 25 g of DGEBA II (0.073 mol)

16 g of phthalic anhydride I (0.108 mol) and 10 g of zinc acetate III (0.045 mol)

This solution is then deposited by spraying onto the surfaces of two prepreg materials reinforced with carbon fiber, based on a first epoxy-amine resin, stored at ambient temperature for more than 30 days, with dimensions 1 cm by 2 cm.

The two prepreg materials are then hot compressed as described in Example 1. A vitrimer composite material is obtained, without the presence of defects, cracks, or fiber breakage. It may be remodeled in a second mold of a predefined conformation for its future application.

According to other possibilities not described in the detailed examples, the vitrimerization reaction mixture may be consist of other systems allowing the function exchanges and a dynamic covalent chemistry, such as epoxy/phenol, epoxy/amine (FIG. 7), epoxy/disulfide systems.

Thus, the present invention has the advantage of allowing the reuse of unused prepreg materials or cutting scraps and in particular the obtention of a vitrimer composite material which may be reshaped several times during its lifespan. The invention therefore allows, through a method that is simple to implement and inexpensive, the reuse of poorly valued prepreg waste as well as the obtention, with this waste, of a completely recyclable composite material, unlike existing methods.

The invention claimed is:

1. A method for recycling prepreg materials comprising the steps of:
   a) providing at least one prepreg material comprising a first thermosetting polymer resin, partially crosslinked, and a weave comprising fibers,
   b) applying a vitrimerization reaction mixture to the at least one prepreg material,
   c) placing the at least one prepreg material coated with the vitrimerization reaction mixture on a mold of a predefined shape,
   d) applying a thermocompression to the at least one prepreg material at a temperature (T1) greater than or equal to a glass transition temperature (Tg) of the first resin, so as to activate a reaction between the vitrimerization reaction mixture and the thermosetting polymer leading to formation of a vitrimer polymer and a transformation of the at least one prepreg material into a vitrimer composite material of the predefined shape.

2. The recycling method according to claim 1 further comprising the steps of:
   e) arranging the vitrimer composite material shaped according to step d) on a second mold of a determined conformation,
   f) applying a thermocompression to the vitrimer composite material at the temperature (T1) so as to reshape the vitrimer composite material.

3. The recycling method according to claim 1, wherein the vitrimerization reaction mixture comprises precursor reagents so as to form a second resin comprising accessible hydroxyl groups so as to allow function exchange reactions with the first thermosetting polymer resin.

4. The recycling method according to claim 1, wherein the vitrimerization reaction mixture comprises precursor reagents of a second resin, and a catalyst for transformation into vitrimer resin, selected from the group consisting of an organometallic or organic compound.

5. The recycling method according to claim 4, wherein a proportion of the catalyst is between 2 to 15% by weight of the vitrimerization reaction mixture.

6. The recycling method according to claim 1, wherein the application of the vitrimerization reaction mixture is carried out by spraying onto the at least one prepreg material.

7. The recycling method according to claim 1, wherein the application of the vitrimerization reaction mixture is carried out by:
   i) soaking the at least one prepreg material in a bath of the vitrimerization reaction mixture for coating the at least one prepreg material,
   ii) filtering the vitrimerization reaction mixture, and recovering the at least one coated prepreg material.

8. The recycling method according to claim 1, wherein the first resin of the at least one prepreg material is made of epoxy-amine polymer and the vitrimerization reaction mixture consists of DGEBA, phthalic anhydride, zinc acetate, and an acetone solvent.

9. The recycling method according to claim 1, which further comprising total recycling steps of:
   g) arranging the vitrimer composite material in a composition comprising at least one monofunctional alcohol,
   h) applying a thermal treatment at a temperature (T2) greater than or equal to the glass transition temperature (Tg) so as to allow the dissolution of the vitrimer resin and recovery of the fibers of the weave so as to recycle compounds of the vitrimer composite material.

\* \* \* \* \*